Aug. 18, 1953    J. F. ZELIK ET AL    2,648,939
PNEUMATIC GRINDER
Filed Oct. 18, 1947
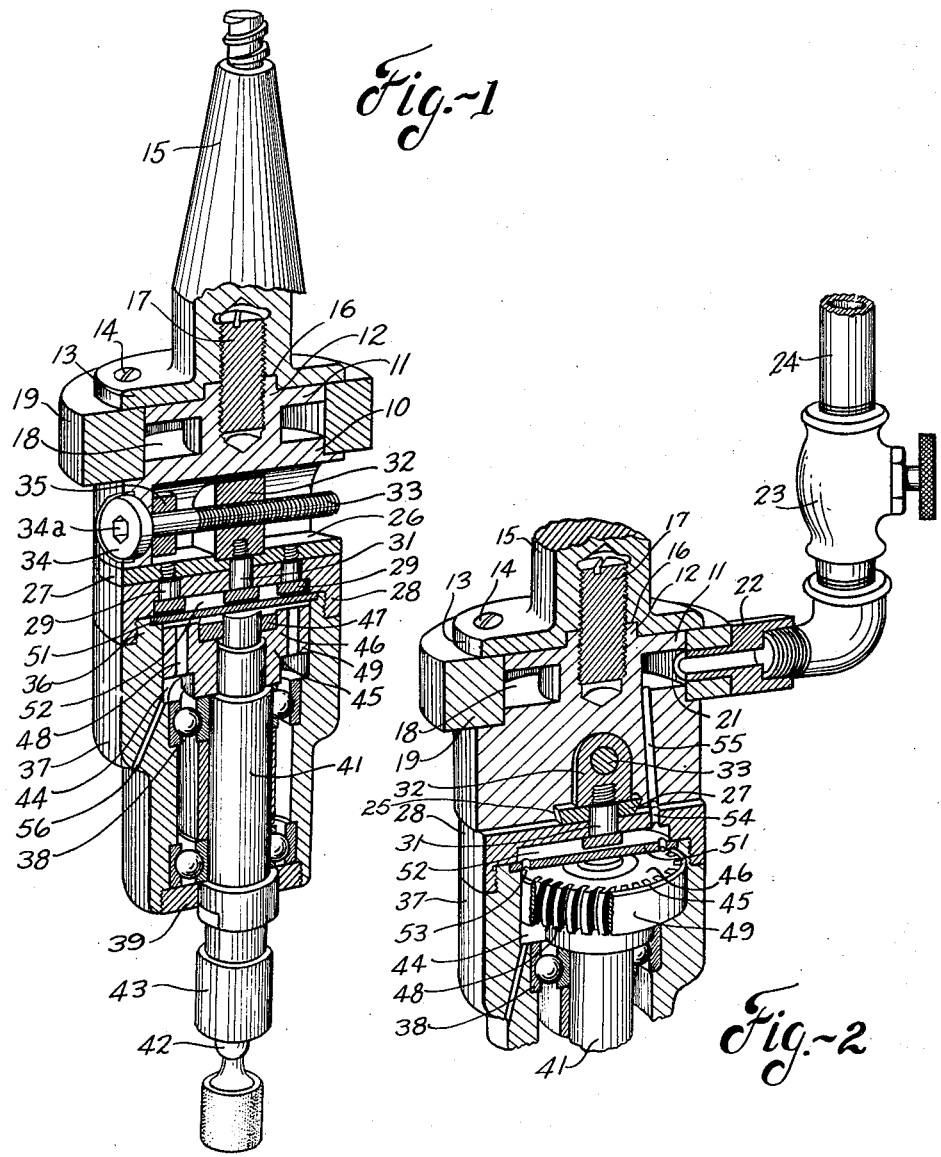
Inventor
Joseph F. Zelik
Finley A. Jennings
Fred A. High
Tom Walker
Attorney Patented Aug. 18, 1953

2,648,939

UNITED STATES PATENT OFFICE 2,648,939

PNEUMATIC GRINDER

Joseph F. Zelik, Finley A. Jennings, and Fred A. High, Dayton, Ohio, assignors to The Vulcan Tool Company, Dayton, Ohio, a corporation of Ohio Application October 18, 1947, Serial No. 780,668

11 Claims. (Cl. 51—245)

1

This invention relates to power operated grinding tools or the like, and more particularly to units of this type capable of use as attachments for machine tools.

While the present unit is especially designed for use with precision boring machines, it being insertable within the usual quill of such machine tools, it is not necessarily limited to such application. When used with precision boring machines, the present unit converts such a tool into a precision jig grinder without the great additional expense of such a machine tool. One machine tool may be made to do the work of two entirely different tools through the use of the present grinding unit.

In the form of machine tool attachments, units of the kind to which this invention relates comprises a body portion provided with a shank or spindle for reception in the quill of the machine tool, and further comprises a body extension housing, a motor and motor shaft, the extension being adjustable laterally relative to the body whereby the motor shaft may be made to rotate about one axis while revolving about another axis. This motion is particularly applicable to the internal grinding of cylinders.

In the prior art, such devices have in the main been electrically powered. They have, therefore, suffered from the defects of complicated structure and of disablement resulting from flexing of the electrical leads between the body portion and the motor housing with each lateral adjustment of the body extension.

The object of the present invention is to improve the construction as well as the means and mode of assembly of grinding units, whereby they not only may be economically manufactured and assembled, but will be more efficient in use, having relatively few parts, easily assembled, and be unlikely to get out of repair.

An object of the present invention is to obtain a grinding or like attachment for machine tools not subject to the disabilities of similar prior art devices, and which is simple and inexpensive of construction and is characterized by durable and reliable operation.

Another object of the invention is to adapt a tool of the kind described for operation by a pressure fluid, such as compressed air.

A further object of the invention is to obviate the effect of pulsations in the pressure fluid system by incorporating in the tool one or more pressure fluid reservoirs.

Still another object is to obtain an improved connection between the body portion of the tool and the body extension facilitating lateral adjustment of the latter and permitting a continuous and full flow of pressure fluid in any such position of lateral adjustment.

A further object of the invention is to provide a grinder unit embodying the advantageous structural features and inherent meritorious characteristics and mode of assembly herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the drawings, wherein is shown the preferred but obviously not the only embodiment of the invention, Fig. 1 is a view in perspective showing the attachment tool of the present invention in longitudinal section; and Fig. 2 is a view similar to Fig. 1, but fragmentary in form, with the section therethrough being taken approximately at right angles to the line along which Fig. 1 is taken.

Like parts are indicated by similar characters of reference throughout the several views.

Referring to the drawings, the illustrated embodiment of the invention comprises a generally cylindrical main body portion 10 having an end 11 of reduced diameter from which extends an axial projection 12. Surrounding the projection 12 and resting on the reduced end portion 11 is a disc 13 secured to the body 10 by screws 14. A shank or spindle 15 is seated on the disc 13, the base of the spindle being formed with a recess 16 receiving the body projection 12. The spindle 15 is secured to the body 10 by an interconnecting screw 17 extending into opposed tapped openings in the spindle and in the projection 12. The spindle 15 tapers upward from its base portion for reception in the quill of a boring machine or the like.

Within the reduced end 11 of the body 10 is a circumferential recess 18 opening through the periphery thereof. The recess 18 is closed by a collar or ring 19 surrounding end portion 11 and held between the body 10 and an overlapping edge of disc 13. There is thus made of the recess 18 an annular space utilized as a reservoir for pressure fluid.

As shown in Fig. 2, the ring 19 is formed with an opening 21 receiving a fitting 22 for connecting the tool to a pressure fluid supply line. The fitting 22 may, as shown, be part of an assembly further comprising a shut-off valve 23 and conduit 24. Under the control of valve 23, therefore, pressure fluid is selectively admitted to space 18 in body 10 from whence it flows, by means later to be described, to pressure fluid responsive means in the tool.

The ring 19 has a close fit intermediate the body 10 and the overlying disc 13, but is nevertheless free to rotate relatively thereto. When installed within the quill of a boring machine, the body 10 rotates in unison with the quill, while the ring 19 remains relatively fixed against rotating motion due to the connection with the fluid pressure supply line 23—24. The fluid pressure therefore is in continuous communication with the chamber 18 regardless of the position of the body 10 relative to the ring 19.

Formed in the end of the body 10 opposite projection 12 is a transverse dovetailed slideway. Above the slideway and parallel thereto is a transverse bore 26 having a curved top surface and opening at its bottom into the slideway. One end of the bore 26 opens through the periphery of body 10, while the other end thereof terminates within the body short of the periphery thereof. Within slideway 25 is a complementary dovetailed slide member 27. Secured to the underside of slide 27 is a spacer 28 which contacts the body 10 and conforms thereto in cross-sectional diameter. Spacer 28 is fastened to slide member 27 by spaced screw studs 29, while a third screw stud 31 passes through spacer 28 and slide 27 into bore 26 where it operatively engages a block 32 having a sliding fit therein.

The block 32 has a threaded connection with a screw 33 passed longitudinally therethrough and axially disposed within bore 26. The screw 33 extends through the body wall closing one end of the bore 26 and the projecting end thereof has an integral head 34 recessed in the body. The head 34 limits axial motion of the screw 33 in one direction, while a stop 35 fixed to the screw within the bore 26 limits axial motion thereof in the opposite direction.

Accordingly, rotation of the screw 33, as by a tool inserted in a socket 34a in head 34, effects a sliding motion of the block 32 within bore 26 longitudinally of the screw. The face of the head 34 is calibrated in degrees for accurate adjustment of the block 32, and it will be understood that the direction of motion of the block changes with reversal of the rotary motion of the screw 33. Further, it will be understood that by reason of the interconnecting screw stud 31, the slidable member 27 and spacer 28 move in unison with block 32 and so may be set by adjustment of screw 33 to a plurality of lateral positions relatively to the longitudinal axis of the body 10.

The lower face of the spacer 28 is bored to receive an upwardly extending flange 36 on the inner end of a body extension or motor housing 37. The spacer element 28 and flange 36 have a screw threaded connection whereby the body extension partakes of the lateral adjustment of the spacer element, the latter serving in effect as a closure cap for the inner end of the body extension. The peripheral surface of the body extension 37 registers with the spacer element 28, these elements being constructed and arranged to act as continuations of the body 10 when in axial alignment therewith. The body extension has a stepped-down formation toward its outer end, the portion of reduced diameter being longitudinally bored to mount therein a ball bearing assembly 38. Bearing assembly 38 is held in place within the body extension 37 by a closure cap 39 and there is passed through the cap and through the bearing a rotatable shaft 41. The shaft 41 extends beyond the body extension 37, the outer end thereof having a chuck 42 thereon for operative engagement with the spindle of a grinding wheel or like work performing implement. A nut 43 is provided for tightening and loosening the grip of the chuck 42.

The inner end of shaft 41 projects into a counterbore 44 in the inner end of body extension 37, the counterbore 44 serving as a chamber to accommodate a rotor 45. The rotor 45 is disc-like in shape, being centrally apertured for the passage of the shaft 41 therethrough and extending outward from the central aperture to a peripheral flange 46. The rotor is seated on the bearing assembly 38 and is rigidly connected to shaft 41 by a nut 47 screw threaded upon the projecting end of the shaft. Extending laterally outward from the flange 46, throughout the circumference of the rotor 45, is a series of closely set, evenly spaced vanes 48. The vanes 48 are curved in an arcuate shape in such manner that passage of pressure fluid therebetween induces a rotary motion of the rotor 45. A bearing ring 49 surrounds the series of vanes 48 and inhibits the passage of pressure fluid outside the vanes.

Closing the outer end of counterbore 44 is a metal diaphragm 51 clamped between an internal ledge on the body extension flange 36 and the overlapping lower end of spacer element 28. Above the diaphragm 51 there is a chamber 52, formed by a central recess in the spacer element 28. The chamber 52 serves as a second pressure fluid reservoir and communicates with the rotor chamber 44 by way of diagonal or inclined ports 53 (Fig. 2) in diaphragm 51, the ports 53 being located adjacent the outer edge of the diaphragm in a position overlying the rotor vanes 48. Pressure fluid is admitted to the chamber 52 through a passage 54 in spacer 28 and a passage 55 in body 10, one end of the passage 55 registering with passage 54 and the other end thereof communicating with reservoir space 18. The passage 54 is transversely elongated relatively to the axis of spacer 28 in order that it may register continuously with passage 55 in all lateral positions of the spacer element 28.

Tracing the flow of pressure fluid through the tool, the fluid enters space 18 by way of inlet opening 21, and, filling this space, flows downward through passages 55 and 54 to chamber 52. Filling chamber 52, the fluid is discharged through port 53 in diaphragm 51 upon the vanes 48 of rotor 45 which thereby is caused to turn and drive the shaft 41. Passing through the vanes 48 the fluid reaches the lower part of rotor chamber 44 from which it passes to exhaust through an opening 56 in body extension 37. The reservoirs 18 and 52 provide a means of insuring a continuous and even supply of pressure fluid to the rotor 45, obviating the effect of pulsations in the pressure fluid system.

The entire tool, comprising body 10, spacer 28 and body extension 37, rotates with spindle 15 when driven by the machine tool. Additionally the shaft 41 rotates independently under the influence of rotor 45. The shaft 41 is disposed along the longitudinal axis of the body extension 37, so that when the body extension and spacer 28 are in a position of registry with the body 10, the shaft 41 and spindle 15 are coaxial and each rotate about the same axis. Upon adjustment of the screw 33, however, to move the spacer 28 and body extension 37 laterally relative to the body 10, the shaft 41 is shifted out of alignment with the spindle 15 and assumes a planetary motion rotating about its own axis while revolving about the axis of the spindle.

A grinder of the present design and construction is not only quite stable and hence vibrationless, but is exceptionally quiet in its operation considering the relatively high speeds at which the rotor 45 is operated. Such grinding units have been successfully used and have proven most efficient in commercial manufacturing for the precision grinding of various parts. The present tool fulfills a long felt need particularly in the tool and die industry, since it permits more complete and universal usage of the presently existing tools and provides in effect a second complete machine tool without the additional outlay of capital for an additional tool which is used for only relatively short periods of time.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A power driven rotary tool attachment for use with a machine tool having a rotating spindle within which spindle said attachment is engageable, comprising an upper and lower body portion, said portions being transversely movable, one relative to the other, the upper body portion being engageable with the rotating spindle of the machine tool, a peripheral recess within the upper body portion, an annular ring supported upon the upper body portion in overlapping relation with the recess forming an annular chamber within the body, said ring being free for rotary motion relative to the body, fluid pressure means connected to the ring and discharging within the chamber in all positions of the ring relative to the body portion, a transverse slideway disposed on the face of said upper body portion adjacent the lower body portion, a corresponding cooperating slide formed on the contacting face of the lower body portion, means anchored in the upper body and engageable with the slide for relatively adjusting the slide and lower body transversely of the upper body, dual axially aligned chambers in the lower body, a rotor assembly axially supported within the lower body with a tool engaging member projecting downwardly therefrom, the rotor being located within the lowermost chamber, and an adjustable conduit interconnecting the upper and lower body portions throughout their range of relative adjustment through which fluid pressure is transmitted from the upper body chambers to the lower body chambers for driving engagement with the rotor within the lowermost chamber, the construction and arrangement being such that the upper body portion in coaxial alignment with the machine tool spindle rotates in unison therewith, while the lower body portion also rotating in unison with the machine tool spindle may be axially offset relative thereto producing a planetary motion of the power driven rotor assembly carried thereby.

2. A grinding attachment for boring machines or the like, comprising a body, a spindle at one end of said body for reception in a drill press chuck or the like, a body extension connected to the other end of said body for rotary motion therewith and for lateral adjustment relative thereto, a grinding shaft rotatably mounted in said body extension, means effecting lateral adjustment of said body extension relative to said body to move said grinding shaft into and out of alignment with the longitudinal axis of said body, a pressure fluid operated rotor arranged in said body extension in driving relation to said grinding shaft, a pressure fluid inlet in said body, a passage in the body, a second passage in the body extension, said passages being in cooperative relation to direct pressure fluid from said inlet to said rotor, at least one of said passages being laterally elongated relative to the axis of the body for communication with its cooperating passage in any position of lateral adjustment of said body extension.

3. A grinding attachment according to claim 2, characterized by a first pressure fluid reservoir in said body between said inlet and said passages and a second pressure fluid reservoir in said body extension between said passages and said rotor.

4. A laterally adjustable grinding attachment for boring machines or the like, including a body and a body extension, means for mounting said body and body extension in a machine tool spindle, a connection between said body and said body extension providing for lateral adjustment of said extension relative to said body, a grinding shaft rotatably mounted in said body extension, a recess in said extension adjacent the body into which the inner end of said shaft extends, a pressure fluid operated rotor arranged in said recess in driving relation to said shaft, a diaphragm disposed in said recess to divide the recess into a first chamber containing said rotor and a second chamber constituting a pressure fluid reservoir, an opening in said diaphragm for admitting pressure fluid from said second chamber to said first chamber, a pressure fluid inlet in said body, and intercommunicating passages in said body and body extension interconnecting said inlet and said second or reservoir chamber, at least one of said passages being laterally elongated relatively to the axis of the body to permit continuous communication of said inlet with said reservoir in any lateral position of adjustment of said body extension.

5. A pneumatic tool attachment for boring machines or the like, comprising a body, a spindle secured to one end of the body for reception in a drill press chuck or the like, a motor housing at the opposite end of said body, a spacer element between said motor housing and said body, said element being secured to said motor housing, a dovetailed slideway in said body adjacent said spacer element, a dovetailed slidable member in said slideway secured to said spacer element, means carried by the attachment for moving said slidable member and thereby said spacer element and said motor housing to a plurality of lateral positions with respect to the longitudinal axis of said body, recesses in the adjacent faces of said spacer element and said motor housing defining a rotor chamber, a pressure fluid operated rotor in said chamber, a driven shaft rotatably mounted in said motor housing and having its inner end extending into said chamber in operative engagement with said rotor, a pressure fluid inlet in said body, and registering passages in said body and said spacer element for conducting pressure fluid from said inlet to said rotor chamber, at least one of said passages being elongated transversely relatively to the axis of the motor housing to register with the other said passage in any position of lateral adjustment of said motor housing.

6. A grinding attachment for boring machines or the like, comprising a spindle rotatably carried by the boring machine or the like, a body portion secured to said spindle, means in said body defining a first fluid pressure chamber, a fluid pressure inlet to said chamber, a body extension connected to said body for unison rotary motion therewith and capable of transverse adjustment relative thereto at right angles to the longitudinal axis of said body and said spindle, means defining a second fluid pressure chamber in said body extension, means placing said first and second chambers in continuous communication, a fluid pressure operated motor housed by said body extension and comprising a vaned rotor, means admitting pressure fluid from said second fluid pressure chamber to said rotor, and said motor further comprising a shaft extending longitudinally through and beyond said body extension and movable with said extension to positions of alignment and offset relation with respect to said spindle.

7. A grinding attachment for boring machines or the like, comprising a body, a spindle at one end of said body for reception in a boring machine chuck or the like, a transverse recess in the opposed end of said body, a member slidable in said recess, said member being rotatable with said body and movable relatively thereto in a transverse direction, a body extension secured to said slidable member and movable therewith, a grinding shaft rotatably mounted in said body extension and movable with said extension into and out of a position of alignment with the longitudinal axis of said body, a pressure fluid operated rotor having a series of openings arranged in inwardly spaced relation with the periphery thereof secured to the inner end of said shaft within said body extension, and means admitting pressure fluid through said body and through said body extension to said rotor to drive said grinding shaft.

8. A grinding attachment according to claim 7, characterized in that said last named means includes fluid pressure storage chambers in said body and said body extension, and interconnecting fluid pressure passages constructed and arranged to maintain continuous communication between said chambers in all transverse positions of adjustment of said body extension.

9. A fluid pressure operated rotary power unit for use with a rotating support, comprising a jointed two-piece rotating body, the body members being transversely movable one relative to the other, a fluid pressure operated rotor assembly carried by one of the rotating body members below which the rotor assembly projects for engagement therewith of a rotary tool member, means carried by one of the body members for laterally adjusting the other body member relative thereto, a fluid pressure chamber within one of the body members within which the rotor assembly extends to receive power therefrom, a fluid pressure receiving chamber within the other body unit receiving the fluid under pressure from a supply thereof, a cover member for the receiving chamber relative to which the body member is rotatable, fluid pressure supply means connected to the relatively stationary cover member continuously discharging fluid pressure operating medium into the receiving chamber during the rotion thereof relative to the cover member and pressure supply means, and an adjustable conduit interconnecting the two chambers in all positions of lateral adjustment of the body members one relative to the other, one of the body members being engageable with the rotating support.

10. A fluid pressure operated power unit for use with a rotating mount, including a pair of normally aligned housings supported within the rotating mount for unison rotation therewith, an independent fluid pressure operated rotor unit axially disposed within one of said housings, the end of which projects beyond the housing for engagement with a rotary cutting tool, a plurality of series connected fluid pressure chambers disposed within said housings providing constant pressure operating means for the independent rotor unit, means for adjusting one of said housings in eccentric relation with the other without disturbing communication between the series connected pressure chambers, and means for supplying fluid under pressure to one of said chambers while said chamber is rotating relative to a fluid supply means in unison with the rotating mount, the construction and arrangement being such that the independent rotor unit has a planetary motion about the rotating mount, the orbit of which may be altered at will while maintaining a constant supply of fluid pressure operating means therefor.

11. A fluid pressure operated power unit engageable with a rotating support, including a multi-section body unit, the sections of which are laterally adjustable relative to each other, a fluid pressure operated rotor assembly in one of said units within the end of which a rotary tool is engageable, and means for supplying fluid pressure operating medium to the rotor assembly when in various positions of lateral adjustment relative to the rotating support, including a rotating receiving chamber in one of the body units receiving during continuous rotation fluid pressure medium from a relatively fixed supply thereof, a second pressure chamber communicating with the rotor assembly in another of the body units, and a relatively adjustable conduit within the multi-section body unit interconnecting the respective chambers regardless of the degree of eccentricity thereof caused by lateral adjustment of the body units relative to each other.

JOSEPH F. ZELIK.
FINLEY A. JENNINGS.
FRED A. HIGH.

References Cited in the file of this patent

UNITED STATES PATENTS

| Number | Name | Date |
|---|---|---|
| 899,519 | Egan | Sept. 29, 1908 |
| 1,107,179 | Norberg | Aug. 11, 1914 |
| 1,557,326 | Powell | Oct. 13, 1925 |
| 1,839,253 | Olofson | Jan. 5, 1932 |
| 1,864,019 | Hoffman | June 21, 1932 |
| 1,864,027 | Pedersen | June 21, 1932 |
| 2,403,546 | Olsen | July 9, 1946 |

FOREIGN PATENTS

| Number | Country | Date |
|---|---|---|
| 104,096 | Sweden | Jan. 22, 1942 |
| 920,919 | France | Jan. 8, 1947 |